March 11, 1958

E. BIFFI 2,826,730

STORAGE BATTERY CHARGING PLANT, WITH GENERATOR POWERED
BY A COMPONENT REVOLVING AT VARIABLE
R. P. M. AND IN BOTH DIRECTIONS

Filed Nov. 29, 1954

*INVENTOR.*

2,826,730
Patented Mar. 11, 1958

2,826,730

STORAGE BATTERY CHARGING PLANT, WITH GENERATOR POWERED BY A COMPONENT REVOLVING AT VARIABLE R. P. M. AND IN BOTH DIRECTIONS

Emilio Biffi, Milan, Italy

Application November 29, 1954, Serial No. 471,751

1 Claim. (Cl. 320—23)

This invention relates to an improved electrical storage battery charging plant particularly designed for application on motor vehicles.

An object of this invention is to provide an electrical storage battery charging plant of a very simple design and practically negligible service, wherein the charging current regulation is automatic and neither commutators nor brushes for the generator of the plant are required.

Another object of this invention is to provide an electrical storage battery charging plant wherein the sizes of the generator are smaller than those of a dynamo for a comparable output.

Another object is to limit the wear of the belt by reducing in a substantial way a high starting couple of the generator.

The above objectives are accomplished according to this invention by providing an alternating current high frequency generator, a first rectifier means for the battery and a further rectifier means for the field circuit of said generator, whereby said further rectifier means feeds an automatic voltage control circuit.

The above object and advantages will be apparent from the following specification of particular embodiments of this invention illustrated in the accompanying drawing, wherein.

Figure 2:
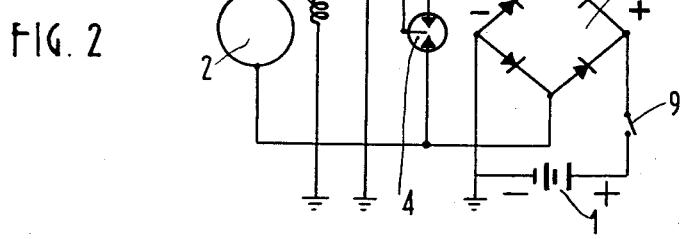
Figs. 2 and 3 are two alternative executions of wiring diagrams of the plant according to this invention.
Figure 3:
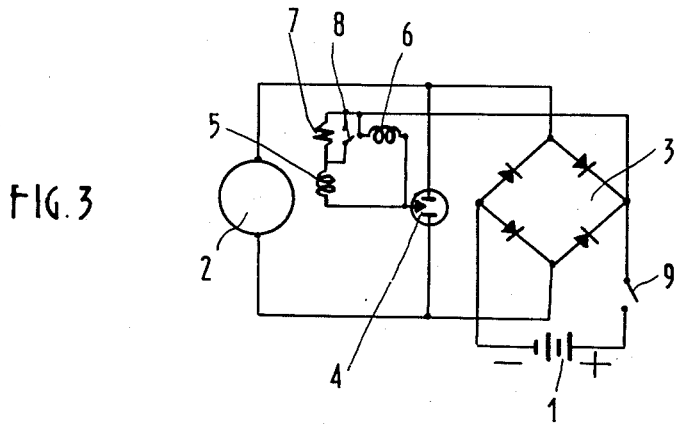

Particularly referring to Figures 2 and 3, according to the first embodiment the pole (—) of the battery 1 is grounded while in the second embodiment both battery poles are insulated from the ground. Both figures show an alternating current high frequency generator 2, a monophase bridge static rectifier 3, two poles of which are branched to said generator, while the other ones are branched to said battery. A push-pull rectifier 4 is branched to said generator and electrically connected with the generator field circuit 5 of the generator and with a voltage limiter circuit 6, the latter being able to insert in series (as shown in the figures) in the generator field circuit a bleeder resistance 7 when the battery voltage overcomes a preestablished value. After the battery 1 has been fully charged and a correspondingly high value has been attained by its voltage, the voltage limiter 6 enters into operation by inserting the bleeder resistance 7 into the generator field circuit, thus cutting the charging current down to a small value. Of course the switch 8, operated by the limiter 6, normally shunts the bleeder resistance 7.

The voltage limiter 6, even when the connection between rectifier 3 and battery 1 is interrupted, operates to protect the rectifier 3 and the whole plant from an over-voltage.

9 is a switch designed to disconnect the rectifier 3 from the battery 1 when the plant is inoperative.

The provision of push-pull rectifier 4 causes the excitation of the generator to be effected by a pulsating current, and when the voltage limiter 6 is in operation, the arcing at its contacts will be considerably reduced. The push-pull rectifier 4 according to this invention renders independent the field coil 5 of the generator together with the voltage limiter 6 from battery 1, so that the battery 1 cannot supply current either to the voltage limiter circuit 6 or to the field circuit 5 when the generator is stalled or stopped.

Figure 1:
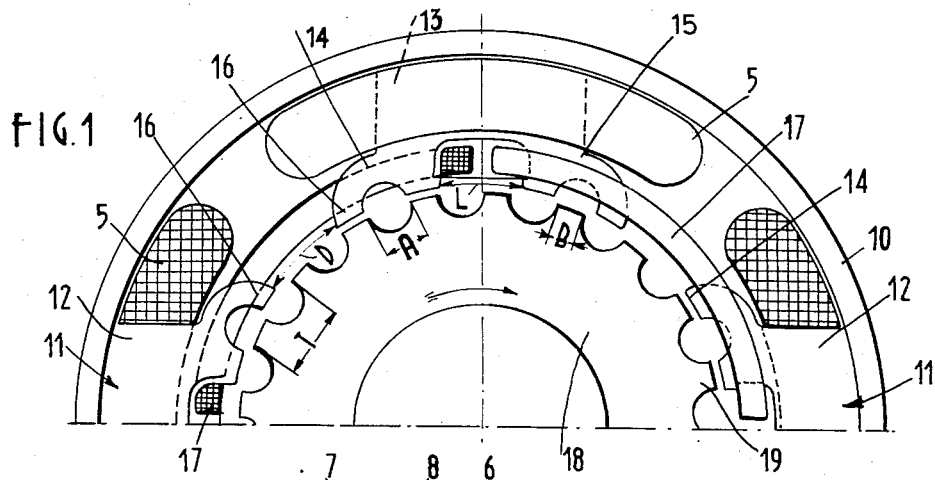
Fig. 1 is a partial sectional view of an alternating current high frequency generator incorporated in the improved electrical battery charging plant according to this invention.

In order to provide a safety of space and weight for the whole plant, a minimal starting couple, and a very high reliability, the generator employed according to this invention is, as illustrated by Fig. 1, of alternating current high frequency type. The latter includes an iron tube 10 being the field-frame of the generator. Inside the iron tube 10 are firmly coupled with their stems 11 the pole cores 12, 13 showing an alternative polarity (N. S.); the ends of said pole cores 12, 13 projecting inwardly are fork shaped, each branch 14, 15 being provided with two teeth 16. The coils 5 constituting the field winding are fitted each around the stems 11 of the pole cores, while the armature coils 17 are fitted between two contiguous branches 14, 15 of two pole cores. As represented the rotor 18 is shaped as a tooth shaped cylinder made up by iron laminations.

If A is the opening of the rotor teeth 19, B their head, and $T=A+B$ the rotor tooth pitch, the distance L between two branches of a pole core is kept equal to $$T + \frac{A-B}{2}$$

(whereby $A$ is $>B$) and T is substantially equal to the distance D between two contiguous branches 14, 15 of two pole cores 12, 13. Therefore when the branches are provided respectively with two, three, four teeth, the number of rotor teeth is respectively equal to five, seven, nine times the number of pole cores.

As known the frequency F of the generator is very high being proportional to the number of the rotor teeth and to the R. P. M. of the generator. As the E. M. F. is proportional to the flux $\phi$ given out by a branch of a pole core, to the total number N of coil turns and to frequency F, a good E. M. F. can be obtained even with relative low values of N and $\phi$. This results in a saving of copper in the armature winding and of iron in the magnetic circuit, i. e. in a considerable reduction of the sizes and cost of the generator.

It shall be understood this invention is not limited to the specific arrangements described for purposes of illustration and changes may be made within the scope of appended claim.

What I claim is:

A battery-charging system, including an alternating current generator with regulator and rectifier means particularly for automobiles, comprising in combination an alternating current high frequency generator having poles and including both toothed rotor and stator, and presenting armature and field coils mounted stationary within the armature of said toothed stator; a monophase static bridge rectifier, two arms of which being branched to the battery to be charged and two other arms of which being branched to generator poles; a push-pull rectifier being branched between the poles of generator and connected to feed the said field coils and, a tension limiter, the latter being branched to said field coils.

References Cited in the file of this patent

UNITED STATES PATENTS

| | | |
|---|---|---|
| Re. 18,516 | Beetem | July 12, 1932 |
| 559,419 | Steinmetz | May 5, 1896 |
| 1,183,411 | Turbayne | May 16, 1916 |
| 1,443,073 | Gilchrist | Jan. 23, 1923 |
| 1,631,574 | Benit | June 7, 1927 |
| 1,921,841 | Roberts | Aug. 8, 1933 |
| 2,117,019 | Conrad | May 10, 1938 |
| 2,519,650 | Hamilton | Aug. 22, 1950 |
| 2,557,298 | Leece et al. | June 19, 1951 |
| 2,607,910 | Ranson et al. | Aug. 19, 1952 |
| 2,651,749 | Weber | Sept. 8, 1953 |

FOREIGN PATENTS

| | | |
|---|---|---|
| 554,827 | Great Britain | July 21, 1943 |
| 512,158 | France | Oct. 7, 1920 |
| 444,712 | Italy | Jan. 28, 1949 |